(12) United States Patent
Shi et al.

(10) Patent No.: US 8,953,459 B2
(45) Date of Patent: Feb. 10, 2015

(54) METHOD AND SYSTEM FOR REPORTING BUFFER SIZE INDEX

(75) Inventors: Xiaojuan Shi, Shenzhen (CN); Yada Huang, Shenzhen (CN); Jian Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 146 days.

(21) Appl. No.: 13/637,855

(22) PCT Filed: Jun. 22, 2010

(86) PCT No.: PCT/CN2010/074276
§ 371 (c)(1),
(2), (4) Date: Sep. 27, 2012

(87) PCT Pub. No.: WO2011/160292
PCT Pub. Date: Dec. 29, 2011

(65) Prior Publication Data
US 2013/0016615 A1    Jan. 17, 2013

(51) Int. Cl.
*H04W 24/10* (2009.01)
*H04W 72/12* (2009.01)
*H04W 72/04* (2009.01)

(52) U.S. Cl.
CPC ...... *H04W 72/1284* (2013.01); *H04W 72/0413* (2013.01)
USPC ........... 370/241; 370/328; 370/329; 370/330; 370/252

(58) Field of Classification Search
CPC .......... H04N 21/4332; H04N 21/4335; H04N 21/434; H04W 72/0413; H04W 72/1284; H04J 3/0626; H04L 5/0098
USPC .......................... 370/241, 328, 329, 330, 252
See application file for complete search history.

(56) References Cited

U.S. PATENT DOCUMENTS

2010/0008236 A1    1/2010  Zhang
2010/0070814 A1    3/2010  Damnjanovic
(Continued)

FOREIGN PATENT DOCUMENTS

CN    101547435 A    9/2009
CN    101562894 A    10/2009
(Continued)

OTHER PUBLICATIONS

3GPP TSG-RAN WG2 Meeting #70bis, Buffer Size Table for CA, Huawei, Stockholm, Sweden, Jun. 28, 2010.
(Continued)

*Primary Examiner* — Jamal Javaid
*Assistant Examiner* — Will Lin
(74) *Attorney, Agent, or Firm* — Oppedahl Patent Law Firm LLC

(57) ABSTRACT

The disclosure claims a method and system for reporting a buffer size index; the method includes: presetting a first table which is a buffer size index table used by a Long Term Evolution (LTE) system, and presetting a second table which is a buffer size index table by increasing a maximum buffer size value to $B_{max-A}$ and increasing a minimum buffer size value to $B_{min-A}$ based on the first table, or by increasing a maximum buffer size value to $B_{max-A}$, and increasing a number of the buffer size index to $N_{LTE-A}$; choosing, by a User Equipment (UE) in reporting a Buffer State Report (BSR), to inquire on the preset first table or second table for the buffer size index; and sending, by the UE, the inquired buffer size index to a base station in the BSR. By adopting the method and system according to the disclosure, the scheduling efficiency in carrier aggregation is improved effectively and reasonable resource allocation is ensured.

4 Claims, 1 Drawing Sheet

(56) References Cited

U.S. PATENT DOCUMENTS

| | | | |
|---|---|---|---|
| 2010/0135166 A1 | 6/2010 | Ahluwalia | |
| 2011/0310800 A1* | 12/2011 | Lin et al. | 370/328 |
| 2013/0100908 A1* | 4/2013 | Xu et al. | 370/329 |

FOREIGN PATENT DOCUMENTS

| | | |
|---|---|---|
| CN | 101682922 A | 3/2010 |
| EP | 2079202 A1 | 7/2009 |
| EP | 2094038 A1 | 8/2009 |
| JP | 2013524680 A | 6/2013 |
| JP | 2013530648 A | 7/2013 |
| RU | 2325045 | 5/2008 |
| WO | 2009038377 A2 | 3/2009 |
| WO | 2010028157 A1 | 3/2010 |

OTHER PUBLICATIONS

3GPP TSG-RAN WG2 #70bis, Details of BSR Handling for CA, Ericsson, Stockholm, Sweden, Jun. 28, 2010.
3GPP TSG-RAN WG2 Meeting #70, Nokia, BSR for Carrier Aggregation. Montreal, R2-102805, May 10, 2010.
3GPP TSG-RAN2#70 meeting, Samsung, REL-10 BSR format and buffer size field, Montreal, R2-102987, May 10, 2010.
3GPP, 3rd Generation Partnership Project; Technical Specification Group Radio Access Network; Evolved universal Terrestrial Radio Access (E-UTRA) Medium Access Control MAC protocol specification, Release 8, TS36.321 V8.5.0, Mar. 23, 2009.
International Search Report in international application No. PCT/CN2010/074276, mailed on Mar. 31, 2011.
English Translation of the Written Opinion of the International Search Authority in international application No. PCT/CN2010/074276, mailed on Mar. 31, 2011.

* cited by examiner

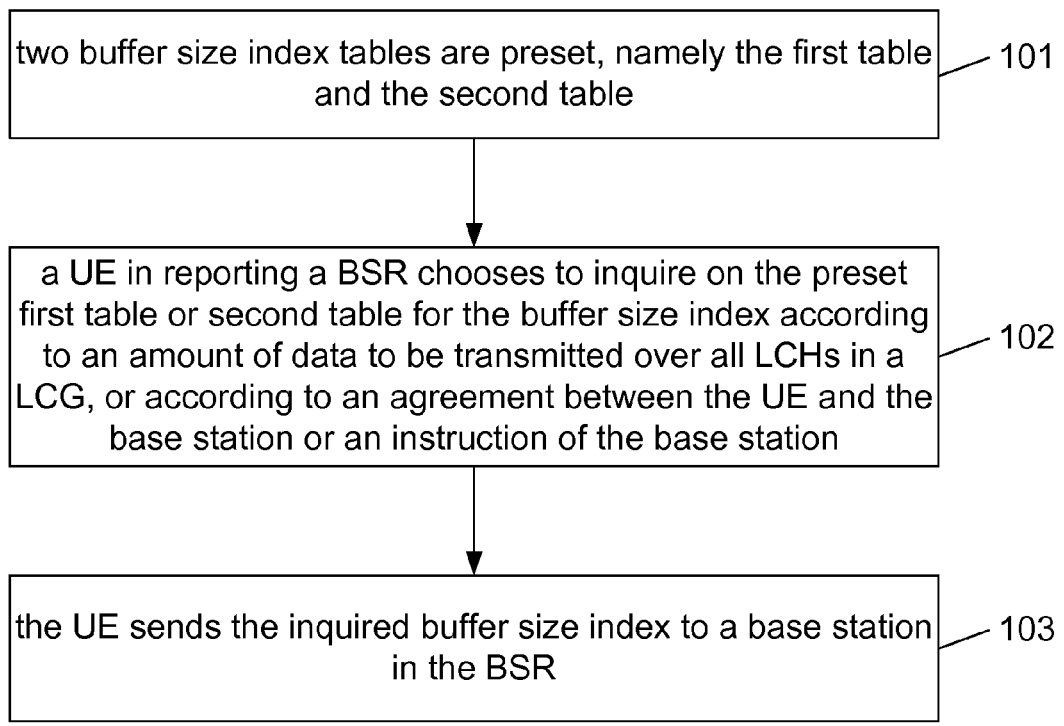

METHOD AND SYSTEM FOR REPORTING BUFFER SIZE INDEX

TECHNICAL FIELD

The disclosure relates to the technical field of wireless communications, and in particular to a method and system for reporting a Buffer Size (BS) index in a wireless network.

BACKGROUND

In an Evolved Universal Terrestrial Radio Access Network (E-UTRAN) of a third-generation mobile communications Long Term Evolution (LTE) system, uplink data are transmitted through a Physical Uplink Shared Channel (PUSCH). An uplink radio resource is allocated to each User Equipment (UE) by an Evolved NodeB (eNB). An access technology adopted by the E-UTRAN is the Orthogonal Frequency Division Multiplexing (OFDM) technology; radio resource management of an E-UTRAN system, compared with a second-generation mobile communications system, is featured by a large bandwidth and a multiple time threads; the radio resource of the E-UTRAN system is presented both on time domain and frequency domain, thus the number of users which the radio resource can bear is largely increased.

A Radio Resource Control (RRC) layer of the LTE system may send a RRC message to realize many operations, such as, establishing the RRC layer link between the UE and the eNB, configuring a system parameter and passing a UE capability parameter. Wherein, the downlink RRC message is sent on a Physical Downlink Shared Channel (PDSCH). Some system-related common parameters, such as the frequency of a cell, the system bandwidth of the cell and other information, are sent to all UEs in the cell by the eNB through a broadcast message, wherein the broadcast message is sent on a Physical Broadcast Channel (PBCH).

For allocating resources and providing services to each UE according to the requirement of the UE, so as to realize better multiplexing performance in uplink transmission, and also for making full use of the system bandwidth flexibly and efficiently, the LTE system formulates a specific control message for uplink transmission resource allocation of the user. Wherein, the control message which dedicated to performing resource allocation for the PUSCH is sent to the UE by the eNB, and the control message for the resource allocation is also called Uplink Grant (UL Grant), wherein the UL Grant is sent on a Physical Downlink Control Channel (PDCCH).

In order to ensure reasonable radio resource allocation for each UE, the LTE system requires the UE to report the data status in the buffer of the UE, and the report is reported to the eNB in form of a Buffer Status Report (BSR). In the LTE system, the Logical Channels (LCHs) of the UE are divided into 4 Logical Channel Groups (LCGs) according to the priority; the BSR contains the group number of each LCG, and the buffer size index which indicates the amount of data to be transmitted over all the LCHs in the LCG. The buffer size index reported in the BSR is obtained by inquiring on a preset table by the UE according to the actual amount of data to be transmitted over all the LCHs in the LCG; the buffer size index of each LCG is represented with 6 bits and 64 buffer size indexes can be represented; a buffer size index table predefined by the LTE system is shown in Table 1 (BSR table1),

TABLE 1

| Index | BS value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 | wherein, Index represents the buffer size index, BS value represents the amount of date corresponding to the buffer size index; when reporting the BSR, the UE inquires on the table according to the amount of data to be transmitted over all the LCHs in the LCG, and reports the corresponding buffer size index.

According to the result obtained by inquiring on Table 1, the buffer size index of each LCG, which is reported in the BSR, is applicable to a LTE single-carrier system. In order to meeting the requirements of various fast-growing wireless services at present and in future, the process of developing a next evolution standard, namely the LTE-Advanced standard, of the LTE system has been started.

The LTE-Advanced system is a standard LTE-Advanced system developed by the 3rd Generation Partner Project (3GPP) organization to meet the International Mobile Telecommunication-Advanced (IMT-Advanced) requirement of the International Telecommunication Union (ITU); it is an evolved version based on the LTE release 8 system; it introduces many new technologies to meet basic requirement of the IMT-Advanced, wherein the most important technology is carrier aggregation.

Because of the shortage of wireless spectrum resource at present, the spectrum resources owned by the mobile providers all over the world are usually scattered; the IMT-Advanced requires higher peak rate (supporting 100 Mbps under high mobility, and supporting 1 Gbps under low mobility), but the maximum bandwidth of the current LTE standard, namely 20 MHz, cannot meet the requirement of the IMT-Advanced, so it is required to expand to a higher bandwidth, for example, the Frequency Division Duplex (FDD) supports 80 MHz at most, and the Time Division Duplex (TDD) supports 100 MHz at most, thus the amount of data that the UE can transmit is also increased by several times, compared with the LTE. Except expanding the bandwidth, in order to achieve a higher rate, Multiple-Input Multiple-Output (MIMO) is also a core technology for improving throughput of the LTE-Advanced system. Taking the early version of the LTE-A system as an example, considering the increase of the uplink bandwidth (which is five times of the LTE bandwidth) and the uplink double-carrier MIMO (which is twice of the LTE single-carrier) together, in the early version of the LTE-A system, the uplink rate of the UE is improved to be 10 times of that of the LTE system.

As shown in Table 1, the BSR table preset in the LTE system can only granularly represent the maximum data of 150K, all the other services with traffic more than 150K belong to the same BSR grade (Grade 63); after the data traffic of the LTE-A system is improved, if the BSR table preset by the LTE system is still used, then the LTE-A service with large throughput will cause that the network is not able to distinguish the buffer status of the UE from 150K to 1500K, so that it impossible to allocate resource reasonably and effectively.

SUMMARY

In view of this, the main purpose of the disclosure is to provide a method and system for reporting a buffer size index, so as to realize more effective and reasonable resource allocation.

In order to achieve the above-mentioned purpose, the technical solution of the disclosure is realized below.

The disclosure provides a method for reporting a buffer size index, which includes:

presetting a first table which is a buffer size index table used by a Long Term Evolution (LTE) system, and presetting a second table which is a buffer size index table by increasing a maximum buffer size value to $B_{max-A}$ and increasing a minimum buffer size value to $B_{min-A}$ based on the first table, or by increasing the maximum buffer size value to $B_{max-A}$, and increasing a number of the buffer size index to $N_{LTE-A}$;

choosing, by a User Equipment (UE) in reporting a Buffer State Report (BSR), to inquire on the preset first table or second table for the buffer size index; and sending, by the UE, the inquired buffer size index to a base station in the BSR.

Preferably, the maximum buffer size value is increased to $B_{max-A}$ and the minimum buffer size value is increased to $B_{min-A}$ based on the first table, and the method further includes:

after increasing the maximum buffer size value to $B_{max-A}$ and increasing the minimum buffer size value to $B_{min-A}$ based on the first table, setting $N_{LTE-A}$ to be less than or equal to the number of the buffer size index N used by the LTE system; determining a design function of the second table according to $B_{min-A}$, $B_{max-A}$ and $N_{LTE-A}$; and presetting the second table according to the determined design function.

Preferably, the maximum buffer size value is increased to $B_{max-A}$ and the minimum buffer size value is increased to $B_{min-A}$ based on the first table; and the method further includes:

after increasing the maximum buffer size value to $B_{max-A}$ and increasing the minimum buffer size value to $B_{min-A}$ based on the first table, expanding the number of the buffer size indexes in the first table to $k_{max}$, wherein $k_{max}$ is a minimum value meeting $B_{k-max} \geq B_{max-A}$, $B_{k-max}$ is an upper limit value in a buffer size range which is indicated by the buffer size index in the case that the buffer size index in the expanded first table is $k_{max}$; intercepting the buffer size indexes meeting that $B_k$ is between $B_{min-A}$ and $B_{k-max}$ in the expanded first table as the second table, wherein the number of the buffer size indexes in the second table is $N_{LTE-A}$, which is set to be less than or equal to the buffer size index N used by the LTE system.

Preferably, the maximum buffer size value is increased to $B_{max-A}$, and the number of the buffer size index is increased to $N_{LTE-A}$, and the method further includes:

after increasing the maximum buffer size value to $B_{max-A}$, and increasing the number of the buffer size index to $N_{LTE-A}$, determining a design function of the second table according to the minimum buffer size $B_{min}$, $B_{max-A}$ and $N_{LTE-A}$ used by the LTE system, and presetting the second table according to the determined design function.

Preferably, the method further includes:

choosing, by the UE in reporting the BSR, to inquire on the preset first table or second table for the buffer size index, according to an amount of data to be transmitted over all Logical Channels (LCHs) in a Logical Channel Group (LCG), or according to an agreement between the UE and the base station or an instruction of the base station.

The disclosure also provides a system for reporting a buffer size index, which includes: a table presetting module, a UE and a base station, wherein the table presetting module is configured to preset a first table which is a buffer size index table used by a Long Term Evolution (LTE) system, and preset a second table which is a buffer size index table by increasing a maximum buffer size value to $B_{max-A}$ and increasing a minimum buffer size value to $B_{min-A}$ based on the first table, or by increasing the maximum buffer size value to $B_{max-A}$, and increasing a number of the buffer size index to $N_{LTE-A}$;

the UE is configured to, when reporting a Buffer State Report (BSR), choose to inquire on the preset first table or second table for the buffer size index, and send the inquired buffer size index to a base station in the BSR; and the base station is configured to obtain the buffer size index from the BSR reported by the UE.

Preferably, the table presetting module is further configured to, after increasing the maximum buffer size value to $B_{max-A}$ and increasing the minimum buffer size value to $B_{min-A}$ based on the first table, set $N_{LTE-A}$ to be less than or equal to the number of the buffer size index N used by the LTE system, determine a design function of the second table according to $B_{min-A}$, $B_{max-A}$ and $N_{LTE-A}$, and preset the second table according to the determined design function.

Preferably, the table presetting module is further configured to, after increasing the maximum buffer size value to $B_{max-A}$ and increasing the minimum buffer size value to $B_{min-A}$ based on the first table, expand the number of the buffer size index in the first table to $k_{max}$, wherein $k_{max}$ is a minimum value meeting $B_{k-max} \geq B_{max-A}$, $B_{k-max}$ is an upper limit value in a buffer size range which is indicated by the buffer size index, in the case that the buffer size index in the expanded first table is $k_{max}$; intercept the buffer size indexes meeting that $B_k$ is between $B_{min-A}$ and $B_{k-max}$ in the expanded first table as the second table, wherein the number of the buffer size indexes in the second table is $N_{LTE-A}$, which is set to be less than or equal to the number of the buffer size index N used by the LTE system.

Preferably, the table presetting module is further configured to, after increasing the maximum buffer size value to $B_{max-A}$, and increasing the number of the buffer size index to $N_{LTE-A}$, determine a design function of the second table according to the minimum buffer size value $B_{min}$, $B_{max-A}$ and $N_{LTE-A}$ used by the LTE system, and preset the second table according to the determined design function.

Preferably, the UE is further configured to, choose to inquire on the preset first table or second table for the buffer size index, according to an amount of data to be transmitted over all Logical Channels (LCHs) in a Logical Channel Group (LCG), or according to an agreement between the UE and the base station or an instruction of the base station.

By adopting the method and system for reporting the buffer size index provided by the disclosure, the base station can assign an uplink grant according to the buffer size index reported in the BSR by the UE, which makes the uplink grant more reasonable and precise, thereby effectively improving the scheduling efficiency in carrier aggregation (i.e. a multi-carrier system), and ensuring reasonable resource allocation.

BRIEF DESCRIPTION OF THE DRAWINGS

FIG. 1 is a flowchart showing a method for reporting a buffer size index according to the disclosure.

DETAILED DESCRIPTION

The technical solution of the disclosure is further described below with reference to the accompanying drawings and specific embodiments in detail.

In the buffer size index table of the LTE system, each buffer size value is designed according to an exponential distribution function, wherein the design function is:

$$B_k = B_{min}\left(\frac{B_{max}}{B_{min}}\right)^{\frac{k-1}{n-1}} \quad n = N-1, \quad k = 1, 2, \ldots N-1 \tag{1}$$

where, $B_0=0$, the buffer size value is 0 when the buffer size index is 0; the buffer size value lies in a range $(B_{k-1}, B_k]$, namely the lower limit value is $B_{k-1}$ and upper limit value is $B_k$, when the buffer size index is k (k=1, 2, ... N−1); correspondingly, $B_k$ represents the upper limit value of the buffer size value range when the buffer size index is equal to k in the BSR table1; $B_{k-1}$ represents the lower limit value of the buffer size index when the buffer size index is equal to k in the BSR table1; $B_{min}$ represents a minimum nonzero buffer size value (called a minimum buffer size value for short) which is 10 Bytes in the LTE system; $B_{max}$ represents the maximum buffer size value which is 150000 Bytes in the LTE system; N represents the maximum buffer size index which is 63 in the LTE system; the buffer size index 63 is used for expressing a situation that the buffer size value is larger than 150000 Bytes uniformly, that is to say, for the situation that the buffer size value is larger than 150000 Bytes, no more buffer size index will be divided in the LTE system. In the LTE system, a relative index error of the buffer size index table obtained by calculating according to the design function of the buffer size value and corresponding parameters is about 15%; the relative index error is selected by considering the scheduling efficiency of system, the overhead for the signaling reported by the BSR and other factors together. The formula for calculating the relative index error is:

$$\beta = \frac{B_{k+1} - B_k}{B_{k+1}}, k = 1, 2, \ldots N-1 \tag{2}$$

After carrier aggregation and an uplink Multiple Input Multiple Output (MIMO) are introduced to the LTE-A system, compared with the LTE system, the uplink rate for the UE is largely improved, and the actual improved multiple may depend on a maximum number of uplink carriers capable of being aggregated and the adopted uplink MIMO order; the maximum uplink rate of the LTE-A system, namely the maximum buffer size value $B_{max-A}$ of the LTE-A system is:

$$B_{max-A} = B_{max} \times N\_CC \times \alpha \tag{3}$$

where, N_CC is the maximum number of uplink carriers capable of being aggregated, α is the adopted uplink MIMO order. In the early version of the LTE-A system, N_CC is equal to 5, and α is equal to 2, so $B_{max-A}$ is equal to 1500000 Bytes; the $B_{max-A}$ used in the disclosure adopts the values from the early version of LTE-A system when no particular description is performed; if the number of the uplink carriers capable of being aggregated or the uplink MIMO order supported by the follow-up LTE-A system is improved, all methods in the embodiments of the disclosure are also applicable.

When the data traffic of the LTE-A system is improved, if the BSR table preset by the LTE system is still used, then the LTE-A service with large throughput will cause that the network can not distinguish the buffer status of UE from 150K to 1500K, which makes it impossible to allocate resource reasonably and effectively. In order to solve the problem, the simplest method is directly expanding the value of $B_{max}$ in the formula 1, namely, setting $B_{max}=B_{max-A}$, and the values of other parameters maintain unchanged. However, a disadvantage of this process is that the relative index error of a new buffer size index table will be improved by 3%, which reduces the scheduling efficiency; when a LTE-A UE only operates on a single carrier in a LTE-A base station, the UE also inquire on the new buffer size index table to report the BSR, which reduces the scheduling efficiency to a certain degree too, thereby making it impossible to allocate resource reasonably and effectively, and making the scheduling error of the LTE-A UE when operating on single carrier higher than that of the LTE UE.

The disclosure provides a method for reporting the buffer size index in the LTE-A system; as shown in FIG. 1, the method mainly includes the steps below.

Step 101, two buffer size index tables are preset, namely a first table which is a buffer size index table used by a LTE system, and a second table which is a buffer size index table by increasing a maximum buffer size value to $B_{max-A}$ and increasing a minimum buffer size value to $B_{min-A}$ based on the first table, or by increasing the maximum buffer size value to $B_{max-A}$, and increasing a number of the buffer size index to $N_{LTE-A}$;

Step 102, a UE in reporting a BSR chooses to inquire on the preset first table or second table for the buffer size index according to an amount of data to be transmitted over all LCHs in a LCG;

Step 103, the UE sends the inquired buffer size index to a base station in the BSR.

The system presets two buffer size index tables, namely the first table (BSR table1) and the second table (BSR table2). The first table is the buffer size index table used by the LTE system, as shown in Table 1, the second table is defined based on the definition of Table 1 in two solutions below.

Solution 1, the minimum buffer size value (the improved minimum buffer size value of LTE-A system is identified as $B_{min-A}$) and the maximum buffer size value (the improved maximum buffer size value of LTE-A system is identified as $B_{max-A}$) are increased base on Table 1; the $N_{LTE-A}$ is set to be less than or equal to the number of the buffer size index N used by the LTE system (namely, the maximum buffer size index $N_{LTE-A}$ of the LTE-A system is less than or equal to 63). The relative index error of the solution is same as that of Table 1, or is reduced compared with Table1.

On the basis of the solution 1, presetting the second table according to $B_{min-A}$, $B_{max-A}$, $N_{LTE-A}$ and other parameters can be implemented through the following two modes:

mode 1, a design function of the second table is determined according to $B_{min-A}$, $B_{max-A}$ and $N_{LTE-A}$, and the second table is obtained according to the determined design function;

mode 2, firstly, the number of the buffer size index of Table 1 is expanded to $k_{max}$, wherein $k_{max}$ is the minimum value meeting $B_{k-max} \geq B_{max-A}$; the buffer size indexes meeting that $B_k$ is between $B_{min-A}$ and $B_{k-max}$ in the expanded first table is intercepted as the second table, wherein the number of the buffer size indexes in the second table is $N_{LTE-A}$.

Wherein $B_{k-max}$ represents an upper limit value of the buffer size value range which is obtained by calculating and is indicated by the buffer size index $k_{max}$ in the expanded Table 1.

Solution 2, the maximum buffer size value ($B_{max-A}$) is improved, and the buffer size index ($N_{LTE-A}$) is increased based on Table 1; the relative index error of the solution is same as that of Table 1.

The design function of the second table is determined according to $B_{min}$, $B_{max-A}$ and $N_{LTE-A}$, and the second table is obtained according to the determined design function.

In said two solutions, the value of each buffer size index in the second table is k=0, 1, . . . , $N_{LTE-A}$. When reporting the BSR, the UE selects the buffer size index in the first table or the second table for reporting.

Further, in order to make the purpose, technical solutions and advantages of the disclosure clear, said two solutions are further described below with reference to the specific embodiments in detail.

In embodiment 1 of the disclosure, the second table is preset according to the mode 2 of the solution 1.

Solution A, the design function of the second table is determined according to $B_{max-A}$ and $N_{LTE-A}$;

$$B_k = B_{min}\left(\frac{B_{max}}{B_{min}}\right)^{\frac{k-1}{n-1}} \quad n = N-1, \quad k = 1, 2, \ldots k_{max} \quad (4)$$

firstly, formula (4) is adopted for calculating, wherein $k_{max}$ is the minimum value meeting $B_{kmax} \geq B_{max-A}$; supposing that $B_{max-A}$ is equal to 1500000 in the embodiment, then it is obtained by the calculating that $k_{max}$ is equal to 77; the maximum buffer size index of the second table is set to $N_{LTE-A}$, wherein the $N_{LTE-A}$ can be set to 63 in the embodiment, so the design function of the second table is:

$$\tilde{B}_k = B_{k+kmax-N_{LTE-A}+1} \quad k=1,2, \ldots N_{LTE-A}-1 \quad (4-1)$$

wherein, $\tilde{B}_k$ represents the upper limit value of the buffer size value range indicated by the buffer size index k in the second table; $B_{k+kmax-N_{LTE-A}+1}$ represents the upper limit value of the buffer size value range indicated by the buffer size index $k+k_{max}-N_{LTE-A}+1$ in the expanded first table.

Solution B, the specific design function of the second table is determined according to $B_{max-A}$ and $B_{min-A}$;

$$B_k = B_{min}\left(\frac{B_{max}}{B_{min}}\right)^{\frac{k-1}{n-1}} \quad n = N-1, \quad k = 1, 2, \ldots k_{min}, \ldots k_{max} \quad (5)$$

firstly, formula (4) is adopted for calculating, wherein $k_{max}$ is the minimum value meeting $B_{kmax} \geq B_{max-A}$ and $k_{min}$ is the minimum value meeting that $B_{kmin} \geq B_{min-A}$; supposing that $B_{max-A}$ is equal to 1500000, and $B_{min-A}$ is equal to 150000, then it is obtained by the calculating that $k_{max}$ is equal to 77, and $K_{min}$ is equal to 63, so the design function of the second table is:

$$\tilde{B}_k = B_{k+kmin-1} \quad k=1,2, \ldots k_{max}-k_{min}+1 \quad (5-1)$$

it is obtained that $N_{LTE-A} = k_{max} - k_{min} + 1$ according to the above formula; and in the embodiment, it is obtained that $N_{LTE-A}$ is equal to 15.

According to the two design solutions for generating the design function of the second table, generating the second table by intercepting the expanded Table 1 may further be implemented by the solutions below.

Solution A-1 (which is based on the solution A), $\tilde{B}_0$ is set to 0, the buffer size value is 0 when the buffer size index is 0; the buffer size range indicated by the buffer size index is a range ($\tilde{B}_{k-1}$, $\tilde{B}_k$] whose lower limit value is $\tilde{B}_{k-1}$ and upper limit value is $\tilde{B}_k$ when the buffer size index is k (k=1, 2, . . . $N_{LTE-A}-1$); the buffer size value is greater than $\tilde{B}_{N_{LTE-A}-1}$ when the buffer size index is $N_{LTE-A}$.

As shown in Table 2, all the buffer size indexes and the buffer size values indicated by them in the second table which is obtained by intercepting the expanded Table 1 according to the method described in the preferred embodiment are illustrated; in the embodiment, $N_{LTE-A}=63$, then $\tilde{B}_1 = B_{16} = 107$ and $\tilde{B}_{N_{LTE-A}-1} = B_{max-A} = 1595876$.

TABLE 2

| Index | BS value [bytes] |
|---|---|
| 0 | BS = 0 |
| 1 | 0 < BS <= 107 |
| 2 | 107 < BS <= 125 |
| 3 | 125 < BS <= 146 |
| 4 | 146 < BS <= 171 |
| 5 | 171 < BS <= 200 |
| 6 | 200 < BS <= 234 |
| 7 | 234 < BS <= 274 |
| 8 | 274 < BS <= 321 |
| 9 | 321 < BS <= 376 |
| 10 | 376 < BS <= 440 |
| 11 | 440 < BS <= 515 |
| 12 | 515 < BS <= 603 |

TABLE 2-continued

| Index | BS value [bytes] |
|---|---|
| 13 | 603 < BS <= 706 |
| 14 | 706 < BS <= 826 |
| 15 | 826 < BS <= 967 |
| 16 | 967 < BS <= 1132 |
| 17 | 1132 < BS <= 1326 |
| 18 | 1326 < BS <= 1552 |
| 19 | 1552 < BS <= 1817 |
| 20 | 1817 < BS <= 2127 |
| 21 | 2127 < BS <= 2490 |
| 22 | 2490 < BS <= 2915 |
| 23 | 2915 < BS <= 3413 |
| 24 | 3413 < BS <= 3995 |
| 25 | 3995 < BS <= 4677 |
| 26 | 4677 < BS <= 5476 |
| 27 | 5476 < BS <= 6411 |
| 28 | 6411 < BS <= 7505 |
| 29 | 7505 < BS <= 8787 |
| 30 | 8787 < BS <= 10287 |
| 31 | 10287 < BS <= 12043 |
| 32 | 12043 < BS <= 14099 |
| 33 | 14099 < BS <= 16507 |
| 34 | 16507 < BS <= 19325 |
| 35 | 19325 < BS <= 22624 |
| 36 | 22624 < BS <= 26487 |
| 37 | 26487 < BS <= 31009 |
| 38 | 31009 < BS <= 36304 |
| 39 | 36304 < BS <= 42502 |
| 40 | 42502 < BS <= 49759 |
| 41 | 49759 < BS <= 58255 |
| 42 | 58255 < BS <= 68201 |
| 43 | 68201 < BS <= 79846 |
| 44 | 79846 < BS <= 93479 |
| 45 | 93479 < BS <= 109439 |
| 46 | 109439 < BS <= 128125 |
| 47 | 128125 < BS <= 150000 |
| 48 | 150000 < BS <= 175612 |
| 49 | 175612 < BS <= 205595 |
| 50 | 205595 < BS <= 240699 |
| 51 | 240699 < BS <= 281796 |
| 52 | 281796 < BS <= 329909 |
| 53 | 329909 < BS <= 386238 |
| 54 | 386238 < BS <= 452184 |
| 55 | 452184 < BS <= 529390 |
| 56 | 529390 < BS <= 619778 |
| 57 | 619778 < BS <= 725599 |
| 58 | 725599 < BS <= 849488 |
| 59 | 849488 < BS <= 994529 |
| 60 | 994529 < BS <= 1164335 |
| 61 | 1164335 < BS <= 1363134 |
| 62 | 1363134 < BS <= 1595876 |
| 63 | BS > 1595876 |

Note that, in Table 2, when the buffer size index is equal to 62, the upper limit value of the buffer size value range indicated by the buffer size index is set as the minimum value meeting $B_{kmax} \geq B_{max-A}$, namely 1595876; In order to reflect the maximum uplink rate of the LTE-A system precisely, the upper limit value can also be manually set as $B_{max-A}=1500000$, that is to say, the buffer size value shown in Table 2 is $1363134 < BS \leq 1500000$ when the index is equal to 62, the buffer size value shown in Table 2 is greater than 1500000 when the index is equal to 63.

Solution A-2 (which is based on the solution A), $\tilde{B}_0$ is set to 0, when the buffer size index is k (k=0, 1, … $N_{LTE-A}-1$), the buffer size range indicated by the buffer size index is a range ($\tilde{B}_k$, $\tilde{B}_{k+1}$] whose lower limit value is $\tilde{B}_k$ and upper limit value $\tilde{B}_{k+1}$; the buffer size value is greater than $\tilde{B}_{N_{LTE-A}-1}$ when the buffer size index is $N_{LTE-A}$.

As shown in Table 3, all the buffer size indexes and the buffer size values indicated by them in the second table which is obtained by intercepting the expanded Table 1 according to the method described in the preferred embodiment are illustrated; in the embodiment, $N_{LTE-A}$ is set to 63, then $\tilde{B}_1=B_{15}=91$, and $\tilde{B}_{N_{LTE-A}-1}=B_{max-A}=1595876$.

TABLE 3

| Index | BS value [bytes] |
|---|---|
| 0 | 0 <= BS <= 91 |
| 1 | 91 < BS <= 107 |
| 2 | 107 < BS <= 125 |
| 3 | 125 < BS <= 146 |
| 4 | 146 < BS <= 171 |
| 5 | 171 < BS <= 200 |
| 6 | 200 < BS <= 234 |
| 7 | 234 < BS <= 274 |
| 8 | 274 < BS <= 321 |
| 9 | 321 < BS <= 376 |
| 10 | 376 < BS <= 440 |
| 11 | 440 < BS <= 515 |
| 12 | 515 < BS <= 603 |
| 13 | 603 < BS <= 706 |
| 14 | 706 < BS <= 826 |
| 15 | 826 < BS <= 967 |
| 16 | 967 < BS <= 1132 |
| 17 | 1132 < BS <= 1326 |
| 18 | 1326 < BS <= 1552 |
| 19 | 1552 < BS <= 1817 |
| 20 | 1817 < BS <= 2127 |
| 21 | 2127 < BS <= 2490 |
| 22 | 2490 < BS <= 2915 |
| 23 | 2915 < BS <= 3413 |
| 24 | 3413 < BS <= 3995 |
| 25 | 3995 < BS <= 4677 |
| 26 | 4677 < BS <= 5476 |
| 27 | 5476 < BS <= 6411 |
| 28 | 6411 < BS <= 7505 |
| 29 | 7505 < BS <= 8787 |
| 30 | 8787 < BS <= 10287 |
| 31 | 10287 < BS <= 12043 |
| 32 | 12043 < BS <= 14099 |
| 33 | 14099 < BS <= 16507 |
| 34 | 16507 < BS <= 19325 |
| 35 | 19325 < BS <= 22624 |
| 36 | 22624 < BS <= 26487 |
| 37 | 26487 < BS <= 31009 |
| 38 | 31009 < BS <= 36304 |
| 39 | 36304 < BS <= 42502 |
| 40 | 42502 < BS <= 49759 |
| 41 | 49759 < BS <= 58255 |
| 42 | 58255 < BS <= 68201 |
| 43 | 68201 < BS <= 79846 |
| 44 | 79846 < BS <= 93479 |
| 45 | 93479 < BS <= 109439 |
| 46 | 109439 < BS <= 128125 |
| 47 | 128125 < BS <= 150000 |
| 48 | 150000 < BS <= 175612 |
| 49 | 175612 < BS <= 205595 |
| 50 | 205595 < BS <= 240699 |
| 51 | 240699 < BS <= 281796 |
| 52 | 281796 < BS <= 329909 |
| 53 | 329909 < BS <= 386238 |
| 54 | 386238 < BS <= 452184 |
| 55 | 452184 < BS <= 529390 |
| 56 | 529390 < BS <= 619778 |
| 57 | 619778 < BS <= 725599 |
| 58 | 725599 < BS <= 849488 |
| 59 | 849488 < BS <= 994529 |
| 60 | 994529 < BS <= 1164335 |
| 61 | 1164335 < BS <= 1363134 |
| 62 | 1363134 < BS <= 1595876 |
| 63 | BS > 1595876 |

Solution B-1 (which is based on the solution B), the buffer size range indicated by the buffer size index is a range ($\tilde{B}_k$, $\tilde{B}_{k+1}$] whose lower limit value is $\tilde{B}_k$ and upper limit value is $\tilde{B}_{k+1}$ when the buffer size index is k (k=1, 2, … $N_{LTE-A}-1$); the buffer size value is greater than $\tilde{B}_{N_{LTE-A}-1}$ when the buffer size index is $N_{LTE-A}$.

As shown in Table 4, all the buffer size indexes and the buffer size values indicated by them in the second table which is obtained by intercepting the expanded Table 1 according to the method described in the preferred embodiment are illustrated; in the embodiment, $B_{min-A}$=150000 and $B_{max-A}$=1500000, then $N_{LTE-A}$=15.

TABLE 4

| Index | BS value [bytes] |
|---|---|
| 0 | 150000 < BS <= 175612 |
| 1 | 175612 < BS <= 205595 |
| 2 | 205595 < BS <= 240699 |
| 3 | 240699 < BS <= 281796 |
| 4 | 281796 < BS <= 329909 |
| 5 | 329909 < BS <= 386238 |
| 6 | 386238 < BS <= 452184 |
| 7 | 452184 < BS <= 529390 |
| 8 | 529390 < BS <= 619778 |
| 9 | 619778 < BS <= 725599 |
| 10 | 725599 < BS <= 849488 |
| 11 | 849488 < BS <= 994529 |
| 12 | 994529 < BS <= 1164335 |
| 13 | 1164335 < BS <= 1363134 |
| 14 | 1363134 < BS <= 1595876 |
| 15 | BS > 1595876 |

When reporting the BSR, according to the amount of data x to be transmitted over all the LCHs in the LCG, if x<$B_{max}$, then the UE inquires on the first table or the second table and reports the buffer size index obtained by the querying to the base station, and if x≥$B_{max}$, then the UE inquires on the second table and reports the buffer size index obtained by the querying to the base station; or, if t x≥$B_{min-A}$, then the UE inquires on the first table and reports the buffer size index obtained by the querying to the base station, and if x>$B_{min-A}$, then the UE inquires on the second table and reports the buffer size index obtained by the querying to the base station. The UE informs, in the BSR, the base station that it is the first table or the second table which the UE inquires on. After receiving the BSR reported by the UE, the base station can obtain the buffer size value of the UE by inquiring on the first table or the second table according to the buffer size index reported by the UE and the table inquired by the UE and reported in the BSR.

Or, when reporting the BSR, the UE chooses to inquire on the first table or the second table according to an agreement between the UE and the base station or an indication of the base station, and reports the buffer size index obtained by the querying to the base station; after receiving the BSR reported by the UE, the base station can obtain the buffer size value of the UE by querying the first table or the second table according to the buffer size index reported by the UE, and the agreement between the base station and the UE or the indication sent to the UE before. The agreement between the UE and the base station includes: choosing the second table for inquiring when there is more than one uplink carrier (which are in operating mode) allocated to the UE by the base station; or else, choosing the first table for inquiring when there is only one uplink carrier (which is in operating mode) allocated to the UE by the base station. Particularly, the process that the UE chooses the first table or the second table for inquiring according to the indication of the base station means: based on the indication sent to the UE by the base station, if the base station indicates the UE to inquire on the first table or the second table, then the UE inquires on the corresponding table.

In the embodiment 1 of the disclosure, on one hand, it is beneficial for realizing the efficient uplink scheduling in the multi-carrier system as the relative index error of the second table is equal to that of the first table; on the other hand, when $N_{LTE-A}$ is set to 63, the UE can use 6 bits to represent the buffer size index continuously; thus, it is no need to modify the format of BSR, which ensures the good backward compatibility and the simple protocol style.

In the embodiment 2 of the disclosure, the second table is preset according to the mode 1 of the solution 1.

The embodiment 2 adopts the method described in the mode 1 of the solution 1 to preset the table, so as to ensure the relative index error of the second table is equal to that of the first table; at the same time, in order to ensure the good backward compatibility and the simple protocol style, $N_{LTE-A}$ is set to 63. The design function of the second table determined according to $B_{min-A}$, $B_{max-A}$ and $N_{LTE-A}$ is:

$$B_k = B_{min-A}\left(\frac{B_{max-A}}{B_{min-A}}\right)^{\frac{k-1}{n-1}} \quad n = N_{LTE-A} - 1, \quad (6)$$
$$k = 1, 2, \ldots N_{LTE-A} - 1$$

or, $$B_k = B_{min-A}\left(\frac{B_{max-A}}{B_{min-A}}\right)^{\frac{k-1}{n-1}} \quad n = N_{LTE-A}, \quad k = 1, 2, \ldots N_{LTE-A} \quad (6\text{-}1)$$

where, $B_{min-A}$ is equal to 107, and $N_{LTE-A}$ is equal to 63.

Particularly, generating the second table according to the design function of the second table can be implemented by the following two solutions.

Solution 1 (which is based on formula 6), $B_0$ is set to 0, the buffer size value is 0 when the buffer size index is 0; the buffer size value range indicated by the buffer size index is a range ($B_{k-1}$, $B_k$] whose lower limit value is $B_{k-1}$ and upper limit value is $B_k$ when the buffer size index is k (k=1, 2, ... $N_{LTE-A}$−1); the buffer size value is greater than $B_{N_{LTE-A}-1}$ when the buffer size index is $N_{LTE-A}$.

As shown in Table 5, all the buffer size indexes and the buffer size values indicated by them in the second table which is obtained by the method described in solution 1 of the preferred embodiment are illustrated.

TABLE 5

| Index | BS value [bytes] |
|---|---|
| 0 | BS = 0 |
| 1 | 0 < BS <= 107 |
| 2 | 107 < BS <= 126 |
| 3 | 126 < BS <= 147 |
| 4 | 147 < BS <= 172 |
| 5 | 172 < BS <= 201 |
| 6 | 201 < BS <= 235 |
| 7 | 235 < BS <= 274 |
| 8 | 274 < BS <= 321 |
| 9 | 321 < BS <= 375 |
| 10 | 375 < BS <= 438 |
| 11 | 438 < BS <= 512 |
| 12 | 512 < BS <= 599 |
| 13 | 599 < BS <= 701 |
| 14 | 701 < BS <= 819 |
| 15 | 819 < BS <= 958 |
| 16 | 958 < BS <= 1120 |
| 17 | 1120 < BS <= 1310 |
| 18 | 1310 < BS <= 1532 |
| 19 | 1532 < BS <= 1791 |
| 20 | 1791 < BS <= 2095 |
| 21 | 2095 < BS <= 2449 |
| 22 | 2449 < BS <= 2864 |
| 23 | 2864 < BS <= 3350 |
| 24 | 3350 < BS <= 3917 |
| 25 | 3917 < BS <= 4581 |
| 26 | 4581 < BS <= 5357 |
| 27 | 5357 < BS <= 6264 |
| 28 | 6264 < BS <= 7326 |
| 29 | 7326 < BS <= 8567 |

TABLE 5-continued

| Index | BS value [bytes] |
|---|---|
| 30 | 8567 < BS <= 10018 |
| 31 | 10018 < BS <= 11716 |
| 32 | 11716 < BS <= 13701 |
| 33 | 13701 < BS <= 16022 |
| 34 | 16022 < BS <= 18737 |
| 35 | 18737 < BS <= 21912 |
| 36 | 21912 < BS <= 25624 |
| 37 | 25624 < BS <= 29966 |
| 38 | 29966 < BS <= 35043 |
| 39 | 35043 < BS <= 40981 |
| 40 | 40981 < BS <= 47925 |
| 41 | 47925 < BS <= 56045 |
| 42 | 56045 < BS <= 65542 |
| 43 | 65542 < BS <= 76647 |
| 44 | 76647 < BS <= 89634 |
| 45 | 89634 < BS <= 104822 |
| 46 | 104822 < BS <= 122584 |
| 47 | 122584 < BS <= 143354 |
| 48 | 143354 < BS <= 167644 |
| 49 | 167644 < BS <= 196050 |
| 50 | 196050 < BS <= 229270 |
| 51 | 229270 < BS <= 268117 |
| 52 | 268117 < BS <= 313548 |
| 53 | 313548 < BS <= 366676 |
| 54 | 366676 < BS <= 428806 |
| 55 | 428806 < BS <= 501464 |
| 56 | 501464 < BS <= 586433 |
| 57 | 586433 < BS <= 685800 |
| 58 | 685800 < BS <= 802004 |
| 59 | 802004 < BS <= 937897 |
| 60 | 937897 < BS <= 1096816 |
| 61 | 1096816 < BS <= 1282663 |
| 62 | 1282663 < BS <= 1500000 |
| 63 | BS > 1500000 |

Solution 2 (which is based on formula 6-1), $B_0$ is set to 0, the buffer size range indicated by the buffer size index is a range $(B_k, B_{k+1}]$ whose lower limit value is $B_k$ and upper limit value is $B_{k+1}$ when the buffer size index is k (k=0, 1 . . . . , $N_{LTE-A}-1$); the buffer size value is greater than $B_{N_{LTE\_A}}$ when the buffer size index is $N_{LTE-A}$.

As shown in Table 6, all the buffer size indexes and the buffer size values indicated by them in the second table which is obtained by the method described in solution 2 of the preferred embodiment are illustrated.

TABLE 6

| Index | BS value [bytes] |
|---|---|
| 0 | 0 <= BS <= 107 |
| 1 | 107 < BS <= 125 |
| 2 | 125 < BS <= 146 |
| 3 | 146 < BS <= 170 |
| 4 | 170 < BS <= 199 |
| 5 | 199 < BS <= 232 |
| 6 | 232 < BS <= 270 |
| 7 | 270 < BS <= 315 |
| 8 | 315 < BS <= 367 |
| 9 | 367 < BS <= 428 |
| 10 | 428 < BS <= 500 |
| 11 | 500 < BS <= 583 |
| 12 | 583 < BS <= 680 |
| 13 | 680 < BS <= 793 |
| 14 | 793 < BS <= 925 |
| 15 | 925 < BS <= 1079 |
| 16 | 1079 < BS <= 1258 |
| 17 | 1258 < BS <= 1467 |
| 18 | 1467 < BS <= 1712 |
| 19 | 1712 < BS <= 1996 |
| 20 | 1996 < BS <= 2329 |
| 21 | 2329 < BS <= 2716 |
| 22 | 2716 < BS <= 3169 |
| 23 | 3169 < BS <= 3696 |
| 24 | 3696 < BS <= 4311 |
| 25 | 4311 < BS <= 5029 |
| 26 | 5029 < BS <= 5866 |
| 27 | 5866 < BS <= 6843 |
| 28 | 6843 < BS <= 7982 |
| 29 | 7982 < BS <= 9311 |
| 30 | 9311 < BS <= 10861 |
| 31 | 10861 < BS <= 12669 |
| 32 | 12669 < BS <= 14779 |
| 33 | 14779 < BS <= 17239 |
| 34 | 17239 < BS <= 20109 |
| 35 | 20109 < BS <= 23457 |
| 36 | 23457 < BS <= 27363 |
| 37 | 27363 < BS <= 31918 |
| 38 | 31918 < BS <= 37232 |
| 39 | 37232 < BS <= 43431 |
| 40 | 43431 < BS <= 50662 |
| 41 | 50662 < BS <= 59097 |
| 42 | 59097 < BS <= 68936 |
| 43 | 68936 < BS <= 80413 |
| 44 | 80413 < BS <= 93802 |
| 45 | 93802 < BS <= 109419 |
| 46 | 109419 < BS <= 127637 |
| 47 | 127637 < BS <= 148887 |
| 48 | 148887 < BS <= 173676 |
| 49 | 173676 < BS <= 202592 |
| 50 | 202592 < BS <= 236322 |
| 51 | 236322 < BS <= 275668 |
| 52 | 275668 < BS <= 321565 |
| 53 | 321565 < BS <= 375103 |
| 54 | 375103 < BS <= 437555 |
| 55 | 437555 < BS <= 510405 |
| 56 | 510405 < BS <= 595384 |
| 57 | 595384 < BS <= 694512 |
| 58 | 694512 < BS <= 810144 |
| 59 | 810144 < BS <= 945027 |
| 60 | 945027 < BS <= 1102368 |
| 61 | 1102368 < BS <= 1285905 |
| 62 | 1285905 < BS <= 1500000 |
| 63 | BS > 1500000 |

When reporting the BSR, according to the amount of data x to be transmitted over all the LCHs in the LCG, if $x<B_{max}$, then the UE inquires on the first table or the second table and reports the buffer size index obtained by the querying to the base station, and if $x \geq B_{max}$, then the UE inquires on the second table and reports the buffer size index obtained by the querying to the base station; or, if t $x \leq B_{min-A}$, then the UE inquires on the first table and reports the buffer size index obtained by the querying to the base station, and if $x>B_{min-A}$, then the UE inquires on the second table and reports the buffer size index obtained by the querying to the base station. The UE informs, in the BSR, the base station that it is the first table or the second table which the UE inquires on. After receiving the BSR reported by the UE, the base station can obtain the buffer size value of the UE by inquiring on the first table or the second table according to the buffer size index reported by the UE and the table inquired by the UE and reported in the BSR.

Or, when reporting the BSR, the UE chooses to inquire on the first table or the second table according to an agreement between the UE and the base station or an indication of the base station, and reports the buffer size index obtained by the querying to the base station; after receiving the BSR reported by the UE, the base station can obtain the buffer size value of the UE by querying the first table or the second table according to the buffer size index reported by the UE, and the agreement between the base station and the UE or the indication sent to the UE before. The agreement between the UE and the base station includes: choosing the second table for inquiring when there is more than one uplink carrier (which are in operating mode) allocated to the UE by the base station;

or else, choosing the first table for inquiring when there is only one uplink carrier (which is in operating mode) allocated to the UE by the base station. Particularly, the process that the UE chooses the first table or the second table for inquiring according to the indication of the base station means: based on the indication sent to the UE by the base station, if the base station indicates the UE to inquire on the first table or the second table, then the UE inquires on the corresponding table.

In the embodiment 2 of the disclosure, on one hand, it is beneficial for realizing the efficient uplink scheduling in the multi-carrier system as the relative index error of the second table is equal to that of the first table; on the other hand, when $N_{LTE-A}$ is set to 63, the UE can use 6 bits to represent the buffer size index continuously; thus, it is no need to modify the format of BSR, which ensures the good backward compatibility and the simple protocol style.

In the embodiment 3 of the disclosure, the second table is preset according to the mode 1 of the solution 1.

The embodiment adopts the method described in the mode 1 of the solution 1 to preset the second table, and determines the design function of the second table according to $B_{min-A}$, $B_{max-A}$ and $N_{LTE-A}$, as shown in formula (6-1), wherein, $$B_{min-A} = \frac{B_{k\_table1}(62) - B_{k\_table1}(61)}{2} = 10398,$$

namely, the maximum error in the first table is taken; $N_{LTE-A}$ is set to 63, and $B_{max-A}$ is equal to 1500000;

when generating the second table according to the design function of the second table, $B_0$ is set 10287, the buffer size range indicated by the buffer size index is a range $(B_k, B_{k+1}]$ whose lower limit value is $B_k$ and upper limit value is $B_{k+1}$ when the buffer size index is k (k=0, 1 ..., $N_{LTE-A}$−1); the buffer size value is greater than $B_{N_{LTE-A}}$ when the buffer size index is $N_{LTE-A}$.

As shown in Table 7, all the buffer size indexes and the buffer size values indicated by them in the second table which is obtained by the method described in the preferred embodiment are illustrated.

TABLE 7

| Index | BS value [bytes] |
|---|---|
| 0 | 10287 < BS <= 10938 |
| 1 | 10938 < BS <= 11842 |
| 2 | 11842 < BS <= 12820 |
| 3 | 12820 < BS <= 13879 |
| 4 | 13879 < BS <= 15025 |
| 5 | 15025 < BS <= 16266 |
| 6 | 16266 < BS <= 17610 |
| 7 | 17610 < BS <= 19064 |
| 8 | 19064 < BS <= 20639 |
| 9 | 20639 < BS <= 22344 |
| 10 | 22344 < BS <= 24190 |
| 11 | 24190 < BS <= 26188 |
| 12 | 26188 < BS <= 28351 |
| 13 | 28351 < BS <= 30693 |
| 14 | 30693 < BS <= 33229 |
| 15 | 33229 < BS <= 35973 |
| 16 | 35973 < BS <= 38945 |
| 17 | 38945 < BS <= 42162 |
| 18 | 42162 < BS <= 45645 |
| 19 | 45645 < BS <= 49415 |
| 20 | 49415 < BS <= 53497 |
| 21 | 53497 < BS <= 57917 |
| 22 | 57917 < BS <= 62701 |
| 23 | 62701 < BS <= 67880 |
| 24 | 67880 < BS <= 73488 |
| 25 | 73488 < BS <= 79558 |
| 26 | 79558 < BS <= 86130 |
| 27 | 86130 < BS <= 93245 |
| 28 | 93245 < BS <= 100947 |
| 29 | 100947 < BS <= 109286 |
| 30 | 109286 < BS <= 118314 |
| 31 | 118314 < BS <= 128087 |
| 32 | 128087 < BS <= 138668 |
| 33 | 138668 < BS <= 150123 |
| 34 | 150123 < BS <= 162524 |
| 35 | 162524 < BS <= 175950 |
| 36 | 175950 < BS <= 190484 |
| 37 | 190484 < BS <= 206219 |
| 38 | 206219 < BS <= 223254 |
| 39 | 223254 < BS <= 241696 |
| 40 | 241696 < BS <= 261662 |
| 41 | 261662 < BS <= 283277 |
| 42 | 283277 < BS <= 306677 |
| 43 | 306677 < BS <= 332010 |
| 44 | 332010 < BS <= 359437 |
| 45 | 359437 < BS <= 389128 |
| 46 | 389128 < BS <= 421273 |
| 47 | 421273 < BS <= 456072 |
| 48 | 456072 < BS <= 493747 |
| 49 | 493747 < BS <= 534533 |
| 50 | 534533 < BS <= 578689 |
| 51 | 578689 < BS <= 626492 |
| 52 | 626492 < BS <= 678244 |
| 53 | 678244 < BS <= 734272 |
| 54 | 734272 < BS <= 794927 |
| 55 | 794927 < BS <= 860593 |
| 56 | 860593 < BS <= 931683 |
| 57 | 931683 < BS <= 1008646 |
| 58 | 1008646 < BS <= 1091967 |
| 59 | 1091967 < BS <= 1182170 |
| 60 | 1182170 < BS <= 1279824 |
| 61 | 1279824 < BS <= 1385546 |
| 62 | 1385546 < BS <= 1500000 |
| 63 | BS > 1500000 |

When reporting the BSR, according to the amount of data x to be transmitted on all the LCHs in the LCG, if $x<B_{max}$, then the UE inquires on the first table and reports the buffer size index obtained by the querying to the base station, and if $x \geq B_{max}$, then the UE inquires on the second table and reports the buffer size index obtained by the querying to the base station; or, if t $x \leq B_{min-A}$, then the UE inquires on the first table and reports the buffer size index obtained by the querying to the base station, and if $x > B_{min-A}$, then the UE inquires on the second table and reports the buffer size index obtained by the querying to the base station. The UE informs, in the BSR, the base station that it is the first table or the second table which the UE inquires on. After receiving the BSR reported by the UE, the base station can obtain the buffer size value of the UE by inquiring on the first table or the second table according to the buffer size index reported by the UE and the table inquired by the UE and reported in the BSR.

Or, when reporting the BSR, the UE chooses to inquire on the first table or the second table according to an agreement between the UE and the base station or an indication of the base station, and reports the buffer size index obtained by the querying to the base station; after receiving the BSR reported by the UE, the base station can obtain the buffer size value of the UE by querying the first table or the second table according to the buffer size index reported by the UE, and the agreement between the base station and the UE or the indication sent to the UE before. The agreement between the UE and the base station includes: choosing the second table for inquiring when there is more than one uplink carrier (which are in operating mode) allocated to the UE by the base station; or else, choosing the first table for inquiring when there is only one uplink carrier (which is in operating mode) allocated to the UE by the base station. Particularly, the process that the UE chooses the first table or the second table for inquiring according to the indication of the base station means: based on the indication sent to the UE by the base station, if the base station indicates the UE to inquire on the first table or the second table, then the UE inquires on the corresponding table.

In the embodiment 3 of the disclosure, on one hand, it is beneficial for realizing the efficient uplink scheduling in the multi-carrier system as the relative index error of the second table is less than that of the first table; on the other hand, when $N_{LTE-A}$ is set to 63, the UE can use 6 bits to represent the buffer size index continuously; thus, it is no need to modify the format of BSR, which ensures the good backward compatibility and the simple protocol style. In the embodiment, it can improve the resource allocation efficiency more effectively as the relative index error of the second table is less than that of the first table; during implement, as the relative index error of the first table is proved to be an acceptable relative index error, in the embodiment, it is ensured that the second table and the first table have the same relative index error, which means the above-mentioned $B_{min-A}$ and $B_{max-A}$ are maintained; the resource scheduling validity in the multi-carrier system can also be ensured by reducing $N_{LTE-A}$; the preferred embodiment will not particularly describe the content of table which is obtained after reducing $N_{LTE-A}$.

In the embodiment 4 of the disclosure, the second table is preset according to the mode 1 of the solution 1.

The embodiment adopts the method described in the mode 1 of the solution 1 to preset the second table, and determines the design function of the second table according to $B_{min-A}$, $B_{max-A}$ and $N_{LTE-A}$:

$$B_k = B_{min-A} \left( \frac{B_{max-A}}{B_{min-A}} \right)^{\frac{k-1}{n-1}} \quad n = N_{LTE-A} + 1, \quad (7)$$

$$k = 1, 2, \ldots N_{LTE-A} + 1$$

where, $B_{min-A}$ is equal to 150000, namely, the maximum buffer size value in the first table is taken; $N_{LTE-A}$ is set to 63, and $B_{max-A}$ is equal to 1500000.

When generating the second table according to the design function of the second table, the buffer size range indicated by the buffer size index is a range $(B_{k+1}, B_{k+2}]$ whose lower limit value is $B_{k+1}$ and upper limit value is $B_{k+2}$ when the buffer size index is k (k=0, 1, . . . , $N_{LTE-A}$−1); the buffer size value is greater than $B_{N_{LTE-A}}$ when the buffer size index is $N_{LTE-A}$.

As shown in Table 8, all the buffer size indexes and the buffer size values indicated by the buffer size indexes in the second table which is obtained by the method described in the preferred embodiment are illustrated.

TABLE 8

| Index | BS value [bytes] |
|---|---|
| 0 | 150000 < BS <= 155584 |
| 1 | 155584 < BS <= 161376 |
| 2 | 161376 < BS <= 167383 |
| 3 | 167383 < BS <= 173614 |
| 4 | 173614 < BS <= 180077 |
| 5 | 180077 < BS <= 186780 |
| 6 | 186780 < BS <= 193733 |
| 7 | 193733 < BS <= 200945 |
| 8 | 200945 < BS <= 208425 |
| 9 | 208425 < BS <= 216183 |
| 10 | 216183 < BS <= 224231 |
| 11 | 224231 < BS <= 232578 |
| 12 | 232578 < BS <= 241236 |
| 13 | 241236 < BS <= 250216 |
| 14 | 250216 < BS <= 259530 |
| 15 | 259530 < BS <= 269191 |
| 16 | 269191 < BS <= 279212 |
| 17 | 279212 < BS <= 289605 |
| 18 | 289605 < BS <= 300386 |
| 19 | 300386 < BS <= 311568 |
| 20 | 311568 < BS <= 323166 |
| 21 | 323166 < BS <= 335196 |
| 22 | 335196 < BS <= 347673 |
| 23 | 347673 < BS <= 360615 |
| 24 | 360615 < BS <= 374039 |
| 25 | 374039 < BS <= 387963 |
| 26 | 387963 < BS <= 402405 |
| 27 | 402405 < BS <= 417384 |
| 28 | 417384 < BS <= 432922 |
| 29 | 432922 < BS <= 449037 |
| 30 | 449037 < BS <= 465753 |
| 31 | 465753 < BS <= 483090 |
| 32 | 483090 < BS <= 501073 |
| 33 | 501073 < BS <= 519726 |
| 34 | 519726 < BS <= 539073 |
| 35 | 539073 < BS <= 559140 |
| 36 | 559140 < BS <= 579954 |
| 37 | 579954 < BS <= 601542 |
| 38 | 601542 < BS <= 623935 |
| 39 | 623935 < BS <= 647161 |
| 40 | 647161 < BS <= 671251 |
| 41 | 671251 < BS <= 696239 |
| 42 | 696239 < BS <= 722156 |
| 43 | 722156 < BS <= 749039 |
| 44 | 749039 < BS <= 776922 |
| 45 | 776922 < BS <= 805843 |
| 46 | 805843 < BS <= 835840 |
| 47 | 835840 < BS <= 866954 |
| 48 | 866954 < BS <= 899227 |
| 49 | 899227 < BS <= 932701 |
| 50 | 932701 < BS <= 967421 |
| 51 | 967421 < BS <= 1003433 |
| 52 | 1003433 < BS <= 1040786 |
| 53 | 1040786 < BS <= 1079529 |
| 54 | 1079529 < BS <= 1119715 |
| 55 | 1119715 < BS <= 1161396 |
| 56 | 1161396 < BS <= 1204629 |
| 57 | 1204629 < BS <= 1249471 |
| 58 | 1249471 < BS <= 1295983 |
| 59 | 1295983 < BS <= 1344226 |
| 60 | 1344226 < BS <= 1394265 |
| 61 | 1394265 < BS <= 1446167 |
| 62 | 1446167 < BS <= 1500000 |
| 63 | BS > 1500000 |

When reporting the BSR, according to the amount of data x to be transmitted on all the LCHs in the LCG, if x<$B_{max}$, then the UE inquires on the first table and reports the buffer size index obtained by the querying to the base station, and if x≥$B_{max}$, then the UE inquires on the second table and reports the buffer size index obtained by the querying to the base station. The UE informs, in the BSR, the base station that it is the first table or the second table which the UE inquires on. After receiving the BSR reported by the UE, the base station can obtain the buffer size value of the UE by inquiring on the first table or the second table according to the buffer size index reported by the UE and the table inquired by the UE and reported in the BSR.

In the embodiment 4 of the disclosure, on one hand, it is beneficial for realizing the efficient uplink scheduling in the multi-carrier system as the relative index error of the second table is less than that of the first table; on the other hand, when $N_{LTE-A}$ is set to 63, the UE can use 6 bits to represent the buffer size index continuously; thus, it is no need to modify the format of BSR, which ensures the good backward compatibility and the simple protocol style. In the preferred embodiment, it can improve the resource allocation efficiency more effectively as the relative index error of the second table is less than that of the first table; during implement, as the relative index error of the first table is proved to be an acceptable relative index error, in the embodiment, it is ensured that the second table and the first table have the same relative index error, which means the above-mentioned $B_{min-A}$ and $B_{max-A}$ are maintained; the resource scheduling validity in the multi-carrier system can also be ensured by reducing $N_{LTE-A}$; the preferred embodiment will not particularly describe the content of table which is obtained after reducing $N_{LTE-A}$.

In the embodiment 5 of the disclosure, the second table is preset according to the solution 2.

In the embodiment, in order to ensure the buffer size values indicated by the first 64 buffer size indexes of the second table are absolutely identical to that of the first table, at the same time, to ensure that the relative index precision of the buffer size index between 150 Kbytes and 1500 Kbytes is maintained to be 15%, the second table improves the maximum buffer size value and increases the buffer size index based on the first table. The design function of the second table determined according to $B_{max-A}$ and $N_{LTE-A}$ is:

$$B_k = B_{min-A} \left( \frac{B_{max-A}}{B_{min-A}} \right)^{\frac{k-1}{n-1}} \quad n = N - 2, \quad (7)$$

$$k = 1, 2, \ldots N_{LTE-A} - 1$$

where, $B_{min-A} = B_{min}$, $B_{max-A} = 1500000$, and $N_{LTE-A} = 78$; as shown in Table 9, all the buffer size indexes and the buffer size values range indicated by the buffer size indexes in the second table which is obtained by the method described in the preferred embodiment are illustrated. In the embodiment 5, it is beneficial for realizing the efficient uplink scheduling in the multi-carrier system as the relative index error of the second table is equal to that of the first table, and the buffer size values between 10 Byte and 1500 Kbytes can be represented by the unified relative index error.

TABLE 9

| Index | BS value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 23 |
| 7 | 23 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 58 |
| 13 | 58 < BS <= 68 |
| 14 | 68 < BS <= 79 |
| 15 | 79 < BS <= 93 |
| 16 | 93 < BS <= 109 |
| 17 | 109 < BS <= 128 |
| 18 | 128 < BS <= 150 |
| 19 | 150 < BS <= 175 |
| 20 | 175 < BS <= 205 |
| 21 | 205 < BS <= 241 |
| 22 | 241 < BS <= 282 |
| 23 | 282 < BS <= 330 |
| 24 | 330 < BS <= 387 |
| 25 | 387 < BS <= 454 |
| 26 | 454 < BS <= 532 |

TABLE 9-continued

| Index | BS value [bytes] |
|---|---|
| 27 | 532 < BS <= 623 |
| 28 | 623 < BS <= 731 |
| 29 | 731 < BS <= 856 |
| 30 | 856 < BS <= 1004 |
| 31 | 1004 < BS <= 1177 |
| 32 | 1177 < BS <= 1379 |
| 33 | 1379 < BS <= 1617 |
| 34 | 1617 < BS <= 1895 |
| 35 | 1895 < BS <= 2221 |
| 36 | 2221 < BS <= 2604 |
| 37 | 2604 < BS <= 3052 |
| 38 | 3052 < BS <= 3578 |
| 39 | 3578 < BS <= 4194 |
| 40 | 4194 < BS <= 4916 |
| 41 | 4916 < BS <= 5763 |
| 42 | 5763 < BS <= 6755 |
| 43 | 6755 < BS <= 7918 |
| 44 | 7918 < BS <= 9282 |
| 45 | 9282 < BS <= 10881 |
| 46 | 10881 < BS <= 12755 |
| 47 | 12755 < BS <= 14951 |
| 48 | 14951 < BS <= 17527 |
| 49 | 17527 < BS <= 20545 |
| 50 | 20545 < BS <= 24084 |
| 51 | 24084 < BS <= 28232 |
| 52 | 28232 < BS <= 33094 |
| 53 | 33094 < BS <= 38794 |
| 54 | 38794 < BS <= 45475 |
| 55 | 45475 < BS <= 53308 |
| 56 | 53308 < BS <= 62489 |
| 57 | 62489 < BS <= 73252 |
| 58 | 73252 < BS <= 85868 |
| 59 | 85868 < BS <= 100657 |
| 60 | 100657 < BS <= 117994 |
| 61 | 117994 < BS <= 138317 |
| 62 | 138317 < BS <= 162140 |
| 63 | 162140 < BS <= 190065 |
| 64 | 190065 < BS <= 222801 |
| 65 | 222801 < BS <= 261175 |
| 66 | 261175 < BS <= 306159 |
| 67 | 306159 < BS <= 358890 |
| 68 | 358890 < BS <= 420703 |
| 69 | 420703 < BS <= 493162 |
| 70 | 493162 < BS <= 578102 |
| 71 | 578102 < BS <= 677671 |
| 72 | 677671 < BS <= 794389 |
| 73 | 794389 < BS <= 931210 |
| 74 | 931210 < BS <= 1091597 |
| 75 | 1091597 < BS <= 1279608 |
| 76 | 1279608 < BS <= 1500000 |
| 77 | BS > 1500000 |

When reporting the BSR, according to the amount of data x to be transmitted on all the LCHs in the LCG, if $x < B_{max}$, then the UE inquires on the first table and reports the buffer size index obtained by the querying to the base station, and if $x \geq B_{max}$, then the UE inquires on the second table and reports the buffer size index obtained by the querying to the base station. The UE informs, in the BSR, the base station that it is the first table or the second table which the UE inquires on. After receiving the BSR reported by the UE, the base station can obtain the buffer size value of the UE by inquiring on the first table or the second table according to the buffer size index reported by the UE and the table inquired by the UE and reported in the BSR.

In all above-mentioned embodiments, the LTE UE accessing the LTE-A system continues to inquire on the first table to report the BSR.

Corresponding to the method for reporting buffer size index, the disclosure further provides a system for reporting buffer size index, which include: a table presetting module, a UE and a base station, wherein the table presetting module is configured to preset a first table which is a buffer size index table used by a LTE system, and preset a second table which is a buffer size index table by increasing a maximum buffer size value to $B_{max-A}$ and increasing a minimum buffer size value to $B_{min-A}$ based on the first table, or by increasing the maximum buffer size value to $B_{max-A}$, and increasing the number of the buffer size index to $N_{LTE-A}$; the UE is configured to, when reporting a BSR, choose to inquire on the preset first table or second table for the buffer size index according to an amount of data to be transmitted over all LCHs in a LCG, or according to an agreement between the UE and the base station or an instruction of the base station, and send the inquired buffer size index to a base station in the BSR; and the base station is configured to obtain the buffer size index from the BSR reported by the UE.

The table presetting module is configured to, after improving the maximum buffer size value to $B_{max-A}$ and improve the minimum buffer size value to $B_{min-A}$ based on the first table, set $N_{LTE-A}$ to be less than or equal to the number of the buffer size index N used by the LTE system, determine a design function of the second table according to $B_{min-A}$, $B_{max-A}$ and $N_{LTE-A}$, and preset the second table according to the determined design function; or, the table presetting module is configured to, after increasing the maximum buffer size value to $B_{max-A}$ and increasing the minimum buffer size value to $B_{min-A}$ based on the first table, expand a number of buffer size index in the first table to $k_{max}$, wherein $k_{max}$ is a minimum value meeting $B_{k-max} \geq B_{max-A}$, $B_{k-max}$ is an upper limit value in a buffer size range which is indicated by the buffer size index, in the case that the buffer size index in the expanded first table is $k_{max}$; intercept the buffer size indexes meeting that $B_k$ is between $B_{min-A}$ and $B_{k-max}$ in the expanded first table as the second table, wherein the number of the buffer size indexes in the second table is $N_{LTE-A}$ which is set to be less than or equal to the number of the buffer size index N used by the LTE system.

The table presetting module is configured to, after increasing the maximum buffer size value to $B_{max-A}$ and increasing the buffer size index to $N_{LTE-A}$ determine the design function of the second table according to the minimum buffer size value $B_{min}$, $B_{max-A}$ and $N_{LTE-A}$ used by the LTE system, and preset the second table according to the determined design function.

To sum up, by adopting the disclosure, the base station assigns the uplink grant according to the buffer size index reported in the BSR by the UE, which makes the uplink grant more reasonable and precise, thereby effectively improving the scheduling efficiency in carrier aggregation (i.e. multi-carrier system), and ensuring reasonable resource allocation.

All those described above are only preferred embodiments of the disclosure, and are not intended to limit the scope of the disclosure.

What is claimed is:

1. A method for reporting a buffer size index, comprising:
presetting a first table which is a buffer size index table used by a Long Term Evolution (LTE) system, and presetting a second table which is a buffer size index table by increasing a maximum buffer size value to $B_{max-A}$ and increasing a minimum buffer size value to $B_{min-A}$ based on the first table;
choosing, by a User Equipment (UE) in reporting a Buffer State Report (BSR), to inquire on the preset first table or second table for the buffer size index; and
sending, by the UE, the inquired buffer size index to a base station in the BSR,
wherein the maximum buffer size value is increased to $B_{max-A}$ and the minimum buffer size value is increased to $B_{min-A}$ based on the first table; and the method further comprises:
after increasing the maximum buffer size value to $B_{max-A}$ and increasing the minimum buffer size value to $B_{min-A}$ based on the first table,
expanding the number of the buffer size indexes in the first table to $k_{max}$, wherein $k_{max}$ is a minimum value meeting $B_{k-max} \geq B_{max-A}$, $B_{k-max}$ is an upper limit value in a buffer size range which is indicated by the buffer size index in the case that the buffer size index in the expanded first table is $k_{max}$; intercepting the buffer size indexes meeting that $B_k$ is between $B_{min-A}$ and $B_{k-max}$ in the expanded first table as the second table, wherein the number of the buffer size indexes in the second table is $N_{LTE-A}$, which is set to be less than or equal to the buffer size index N used by the LTE system.

2. The method for reporting the buffer size index according to claim 1, further comprising:
choosing, by the UE in reporting the BSR, to inquire on the preset first table or second table for the buffer size index, according to an amount of data to be transmitted over all Logical Channels (LCHs) in a Logical Channel Group (LCG), or according to an agreement between the UE and the base station or an instruction of the base station.

3. A system for reporting a buffer size index, comprising: a table presetting module, a User Equipment (UE) and a base station, wherein
the table presetting module is configured to preset a first table which is a buffer size index table used by a Long Term Evolution (LTE) system, and preset a second table which is a buffer size index table by increasing a maximum buffer size value to $B_{max-A}$ and increasing a minimum buffer size value to $B_{min-A}$ based on the first table, wherein the table presetting module is the result of execution on a processor of software stored in a memory;
the UE is configured to, when reporting a Buffer State Report (BSR), choose to inquire on the preset first table or second table for the buffer size index, and send the inquired buffer size index to a base station in the BSR; and
the base station is configured to obtain the buffer size index from the BSR reported by the UE,
wherein the table presetting module is further configured to, after increasing the maximum buffer size value to $B_{max-A}$ and increasing the minimum buffer size value to $B_{min-A}$ based on the first table, expand the number of the buffer size index in the first table to $k_{max}$, wherein $k_{max}$ is a minimum value meeting $B_{k-max} \geq B_{max-A}$ $B_{k-max}$ is an upper limit value in a buffer size range which is indicated by the buffer size index, in the case that the buffer size index in the expanded first table is $k_{max}$ ; intercept the buffer size indexes meeting that $B_k$ is between $B_{min-A}$ and $B_{k-max}$ in the expanded first table as the second table, wherein the number of the buffer size indexes in the second table is $N_{LTE-A}$ which is set to be less than or equal to the number of the buffer size index N used by the LTE system.

4. The system for reporting the buffer size index according to claim 3, wherein the UE is further configured to, choose to inquire on the preset first table or second table for the buffer size index, according to an amount of data to be transmitted over all Logical Channels (LCHs) in a Logical Channel Group (LCG), or according to an agreement between the UE and the base station or an instruction of the base station.

* * * * *